United States Patent [19]

Graham

[11] Patent Number: 4,587,646

[45] Date of Patent: May 6, 1986

[54] TONE ARM ASSEMBLY

[76] Inventor: Robert Graham, 2 Baron Park, Apt. 30, Burlington, Mass. 01803

[21] Appl. No.: 488,183

[22] Filed: Apr. 25, 1983

Related U.S. Application Data

[63] Continuation of Ser. No. 287,958, Jul. 29, 1981, abandoned, which is a continuation-in-part of Ser. No. 67,264, Aug. 17, 1979, abandoned.

[51] Int. Cl.$^4$ .............................................. G11B 3/14
[52] U.S. Cl. .................................. 369/248; 369/254; 369/255
[58] Field of Search .................. 369/248, 254, 255

[56] References Cited

U.S. PATENT DOCUMENTS

| | | | |
|---|---|---|---|
| 1,883,100 | 10/1932 | Terrell | 369/254 |
| 2,363,655 | 11/1944 | Dally | 369/248 |
| 3,011,792 | 12/1961 | Demaree et al. | 369/254 |
| 3,167,317 | 1/1965 | Wilson | 369/254 |
| 3,231,283 | 1/1966 | Stanton | 369/248 |
| 3,292,935 | 12/1966 | Cooper | 369/248 |
| 3,297,830 | 1/1967 | Baloghy | 369/248 |
| 3,319,967 | 5/1967 | Zimmerman | 369/254 |
| 3,366,382 | 1/1968 | Haddy | 369/248 |
| 3,380,744 | 4/1968 | Ohnishi et al. | 369/254 |
| 3,645,541 | 2/1972 | Robertson-Aikman | 369/254 |
| 3,682,485 | 8/1972 | Guha | 369/248 |
| 3,836,155 | 9/1974 | Joannou | 369/248 |
| 4,079,943 | 3/1978 | Motita et al. | 369/254 |
| 4,101,133 | 7/1978 | Aoki et al. | 369/254 |
| 4,113,265 | 9/1978 | Ireta | 369/254 |
| 4,146,236 | 3/1979 | Tsukamoto | 369/254 |
| 4,162,076 | 7/1979 | Nakatsuka | 369/255 |

FOREIGN PATENT DOCUMENTS 2103861 2/1983 United Kingdom ............... 369/254

*Primary Examiner*—Steven L. Stephan
*Attorney, Agent, or Firm*—John W. Freeman

[57] ABSTRACT

A tone arm assembly of the type employed in phonograph assemblies and the like, wherein the tone arm assembly is supported on a unipivot bearing assembly having a pivot point coinciding with an imaginary horizontal line extending through a center of gravity of the tone arm assembly, with the horizontal line extending perpendicular to a longitudinal axis extending through the tone arm assembly from a pick-up cartridge positioned at one end to a counterweight positioned at an opposite end thereof.

14 Claims, 26 Drawing Figures

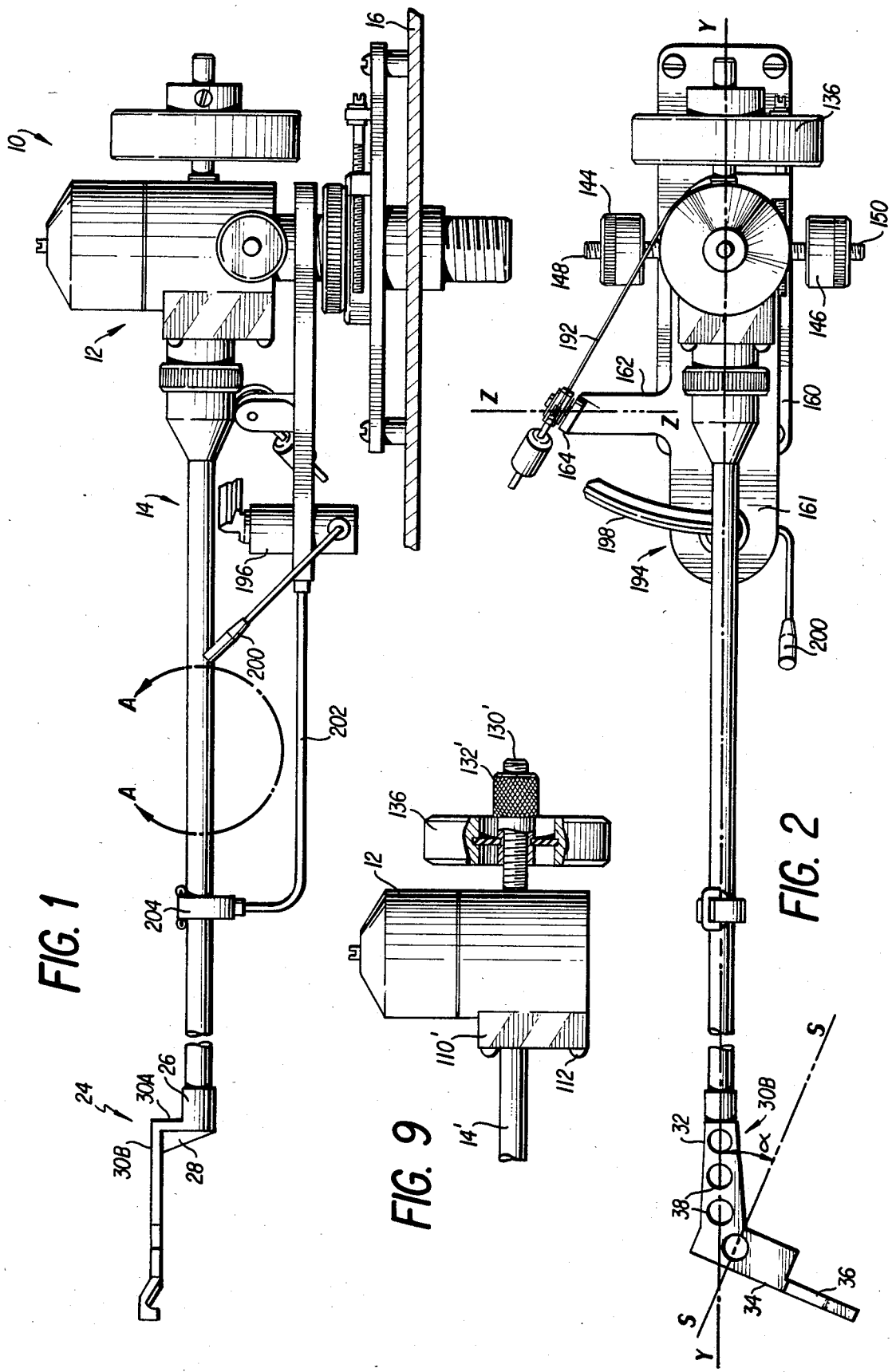

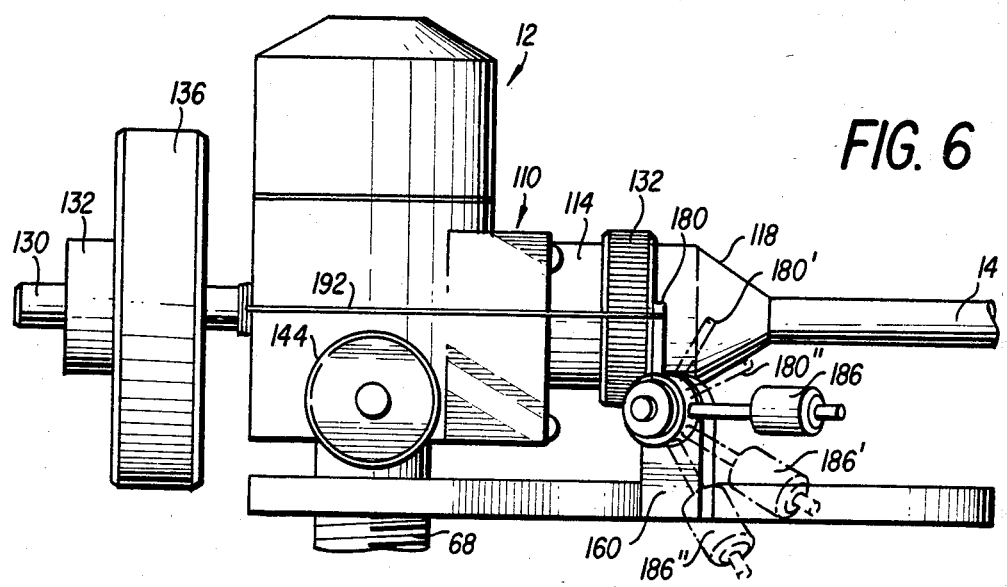
FIG. 6
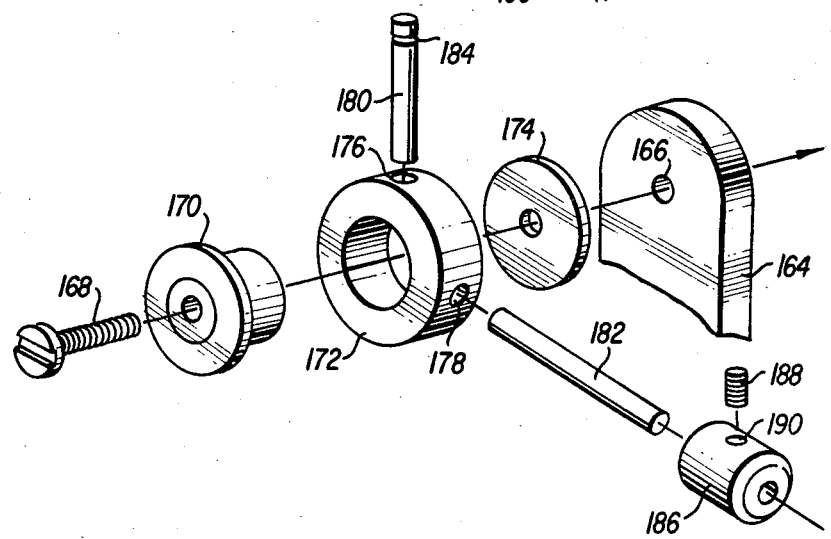
FIG. 7
FIG. 4
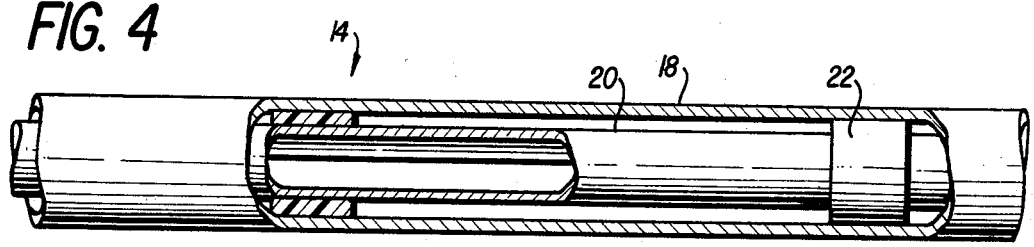
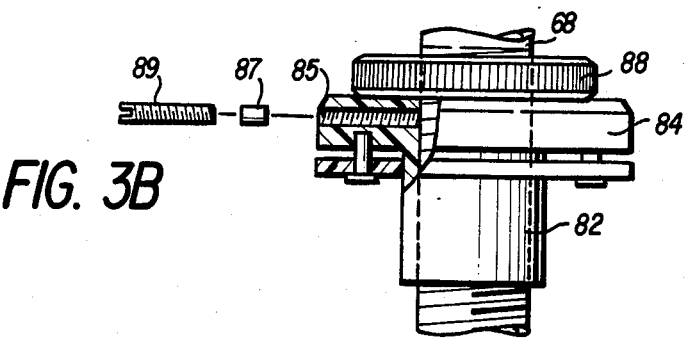
FIG. 3B

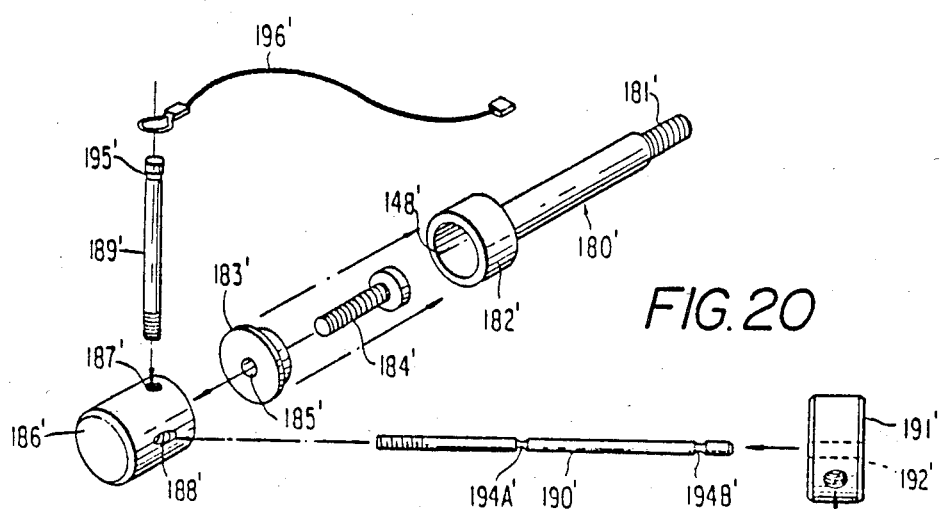
FIG.20
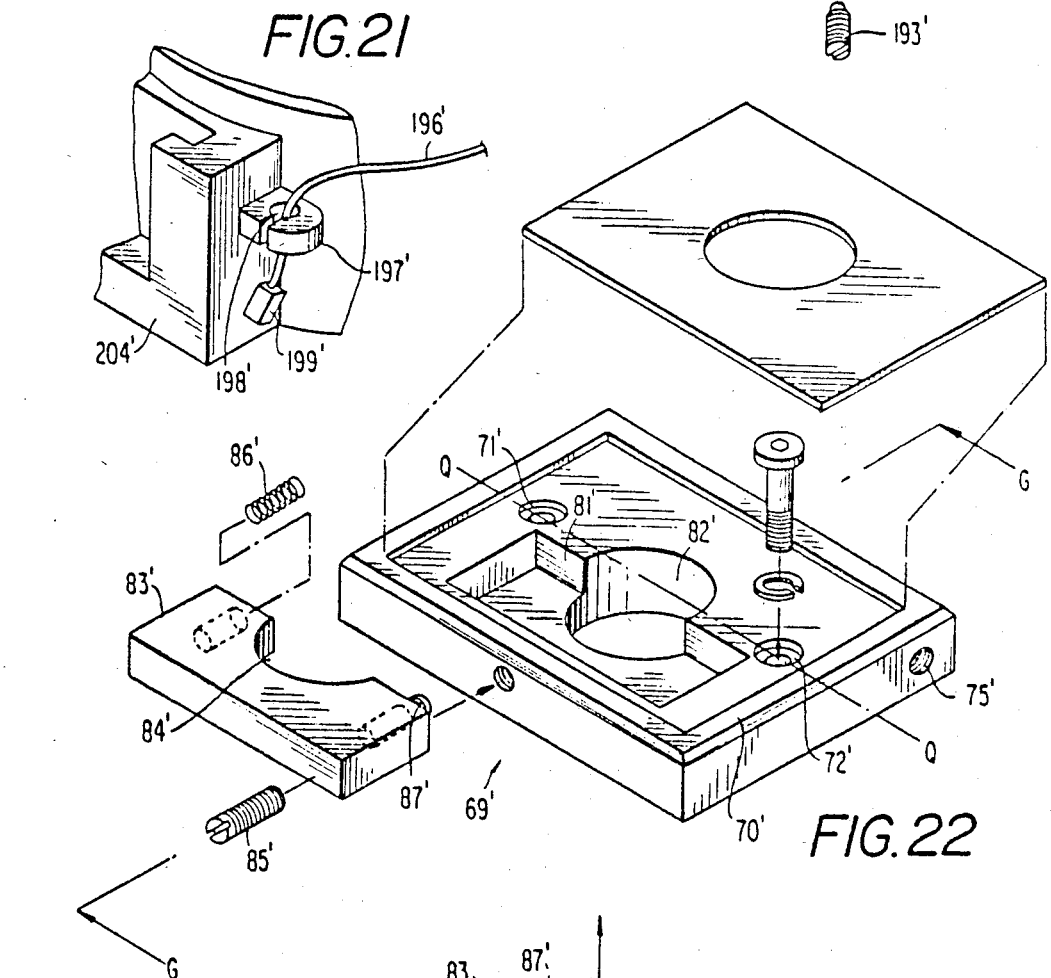
FIG.21
FIG.22
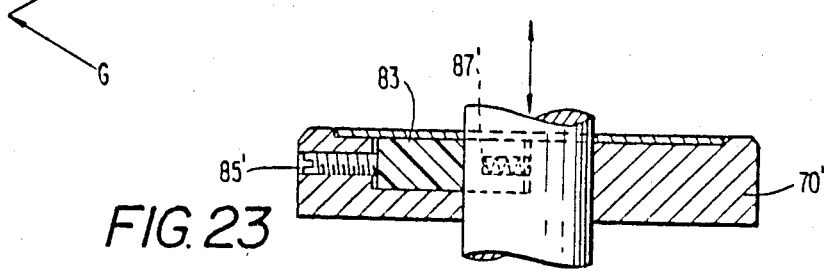
FIG.23

TONE ARM ASSEMBLY

CROSS REFERENCE TO RELATED APPLICATIONS

This application is a continuation application of my copending U.S. application Ser. No. 287,958 filed July 29, 1981 which in turn is a continuation-in-part (CIP) of my then copending application Ser. No. 67,264 filed Aug. 17, 1979 both of which applications are now abandoned. The subject matter of application Ser. No. 287,958 and application Ser. No. 67,264 are incorporated into the present application by this reference.

BACKGROUND OF THE INVENTION

The present invention generally relates to a tone arm assembly of the type employed with sound reproduction equipment, such as phonograph assemblies and the like. In particular, the present invention is directed to a uniquely balanced tone arm assembly capable of distortion free tracking across even highly warped record surfaces.

Conventional pivoting-type tone arm assemblies usually include an elongated arm member having an intermediate portion pivotally attached to a support housing mounted on a frame portion of the phonograph assembly. A pick-up cartridge and stylus assembly is attached to one end portion of the elongated arm, with a counterweight adjustably mounted on the opposite end portion. By pivotally attaching the arm to the housing assembly, it is possible for the stylus to move in both the vertical and horizontal directions as required when tracking over an undulating record surface. In order to achieve high fidelity sound reproduction, it is essential that the stylus be allowed to precisely follow each of the peaks and troughs formed in the record surface. If the stylus is deflected from its normal tracking path across the record surface, a degree of distortion is introduced, with the amount of distortion being directly dependent on the amount of deflection incurred by the stylus. The problem facing the prior art is to pivotally balance the tone arm above the record surface in such a manner that the stylus is allowed to move as freely as possible over the peaks and troughs of the record surface.

Early pivoting-type tone arm support assemblies usually employed independent bearing systems for controlling the vertical and lateral movements of the tone arm relative to the record surface. For example, ball races, knife edges and even simple sleeved members often made up one or both of the independent bearing systems. Such multiple bearing systems have proven less than completely satisfactory, in that it is practically impossible to isolate the bearing systems from affecting one another. As a result, the bearing assembly controlling lateral movement tended to inhibit free vertical movement of the tone arm, while the vertical bearing assembly tended to somewhat inhibit the lateral movement of the tone arm, resulting in an overall reduction in the fidelity of the sound reproduced from the record. Furthermore, because such independent bearing assemblies were generally complex in structure, it was difficult, if not impossible, to maintain the tone arm in a balanced condition over an extended period of time.

In an effort to overcome the type of problems associated with multiple support bearing assemblies, it has been suggested that the entire tone arm assembly be balanced on a single, unipivot bearing assembly capable of pivoting the tone arm in both the vertical and the lateral direction relative to the record surface. In order to balance the tone arm above the support housing, the prior art considered it essential that the pivot point of the unipivot bearing assembly be positioned vertically above the center of gravity of the tone arm to create a so-called beam-balance mounting assembly. Such an arrangement was considered to be stable in both the vertical and horizontal planes, in that any pivoting movement of the tone arm would generate a restoring force which tended to restore the tone arm to its initially balanced position. In effect, pivoting movement of the tone arm tended to displace the center of gravity of the tone arm assembly toward the raised end portion, thereby creating a restoring force which attempted to return the center of gravity to its initial position. The main drawback of such beam-balance mounting systems is that the restoring forces generated during the vertical pivoting movement of the tone arm opposed the vertical tracking movement of the stylus, thereby deflecting the stylus from its normal path. As a result of such deflections, the sound reproduced from the record was distorted with a corresponding reduction in the fidelity of the tone arm assembly.

The beam-balance achieved by positioning the pivot point vertically above the center of gravity of the tone arm did provide some sideways or lateral stability to the tone arm. In particular, lateral rolling movement of the tone arm generated restoring forces which tended to return the tone arm toward its proper position.

Typical of such a beam-balanced unipivot tone arm is the assembly suggested in U.S. Pat. No. 3,231,283 issued Jan. 25, 1966 to Stanton. Stanton clearly suggested that the pivot point be positioned vertically above a plane passing through the center of gravity of the tone arm, the plane being defined as extending through the center of gravity of the counterweight and the head shell, respectively. Because a beam-balance effect is created in Stanton, longitudinal pivoting movement and/or lateral rolling movement of the tone arm must create restoring forces proportional to the degree of movement. These restoring forces attempt to return the tone arm to its initial position and thus adversely affect the desired tracking force acting on the stylus. As the tone arm in Stanton tracks over a warped record surface, the relatively large vertical pivoting movement of the tone arm creates a significant restoring force which opposes any movement of the tone arm away from its initial position. While Stanton provides desirable lateral balancing of its tone arm, the adverse restoring forces generated during vertical tracking movements of the tone arm render the Stanton assembly totally unsatisfactory.

Applicant has determined that if the pivot point of a unipivot bearing assembly can be carefully positioned to coincide with an imaginary horizontal line intersecting the center of gravity of the tone arm sub-assembly and extending perpendicular to an axis joining the head shell with a rear counterweight, vertical tracking movements of such a tone arm will not generate unwanted restoring forces. As the tone arm vertically pivots while tracking over a record surface, the only vertical force acting on the tone arm is the tracking force selectively chosen through placement of the rear counterweight.

In a further approach to the problem of providing proper balance, U.S. Pat. No. 4,113,265 issued Sept. 12, 1978 to Iyeta suggests employing a pair of lateral counterweights for controlling sideways or lateral roll of the tone arm. The counterweights are located forward of the pivot point in Iyeta and tend to significantly increase the mass of the tone arm assembly. Furthermore, because the inertia of the tone arm is equal to the mass times the square of the distance from the pivot point, the forward mounted counterweights suggested in Iyeta tend to generate an excessive inertia level. Another drawback is the lateral counterweight induced rotation of the tone arm about its longitudinal axis as the Iyeta tone arm tracks in a vertical direction on a warped record. This phenomenon produces uneven record and stylus wear as well as reduced channel separation between the left and right signals with a resulting decrease of stereo effect from the loud speakers.

In order to provide a tone arm with sufficient lateral stability and yet eliminate the types of problems confronting Iyeta, applicant has determined that a pair of laterally arranged counterweights should have a center of gravity disposed vertically below the pivot point and the center of gravity of the tone arm sub-assembly. Furthermore, to prevent the tone arm from rolling when tracking warped records, the axis joining the counterweights should extend perpendicular to the stylus cantilever. Because the center of gravity of the counterweights is slightly below the pivot point, very slight restoring forces are generated during vertical movement of the tone arm. For example, in one embodiment restoring forces in the range of 1-5 milligrams (mg) were generated for a ¼ inch vertical movement of the tone arm. Such restoring forces can be considered inconsequential when compared to conventional tracking forces measured in grams. In effect, because applicant's specially constructed lateral counterweights provide the tone arm with lateral stability with a minimum increase of inertia, the pivot point essentially coincides with the center of gravity to effectively eliminate vertical restoring forces which plague conventional tone arm assemblies of the Stanton type.

As will become evident from a reading of the following specification and claims, the tone arm assembly of the present invention also includes additional structural features which further reduce the amount of distortion introduced into the sound reproduction process. For example, the tone arm itself is formed from a pair of concentrically extending tubular members having a plurality of spaced, acoustic dampening bands positioned therebetween to reduce resonances from being transmitted through the tone arm.

OBJECTS AND SUMMARY OF THE PRESENT INVENTION

An object of the present invention is to provide a tone arm mounting assembly, wherein a unique unipivot bearing assembly pivotally supports a tone arm sub-assembly with the bearing assembly having a pivot point located in a horizontal line intersecting the center of gravity of the sub-assembly and extending perpendicular to a longitudinal axis of the tone arm sub-assembly.

A further object of the present invention is to provide a tone arm assembly wherein a pair of lateral counterweights extend from either side of the tone arm sub-assembly, the counterweights having a center of gravity aligned with and positioned vertically beneath the pivot point of the unipivot bearing assembly.

Another object of the present invention is to provide a tone arm assembly including a pair of lateral counterweights positioned within a vertical plane extending substantially parallel to the major axis of the tone arm stylus and perpendicular to the stylus cantilever.

Another object of the present invention is to provide a tone arm assembly, wherein the tone arm itself includes a pair of concentrically arranged tubular shaft members having a plurality of irregularly spaced, acoustic dampening bands extending therebetween to dampen resonances within the tone arm.

A further object of the present invention is to provide a tone arm assembly, wherein a forward portion of the tone arm is releasably attached to a central housing assembly through a quick-release coupling mounted near the pivot assembly to keep the additional weight of the connector from appreciably adding effective mass to the tone arm, as it would if mounted at the front end of the arm, as well as to allow for easy disassembly of the tone arm assembly for shipment and simple replacement of pick-up cartridges already mounted on the forward headshell assembly.

A further object of the present invention is to provide a tone arm mounting assembly which can be easily adjusted in both the vertical and horizontal directions relative to a frame portion of the phonograph assembly.

Another object of the present invention is to provide a tone arm assembly, wherein a first type of relatively thick signal wire is positioned within the forward portion of the tone arm for durability in handling by the user, and relatively fine Litz-type signal wire is positioned within the remaining portion of the tone arm as well as within the mounting assembly to reduce the drag of the signal wire on the pivoting movement of the tone arm.

Another object of the present invention is to provide a removably attached rear counterweight assembly which employs a rack and pinion drive for adjusting the position of the rear counterweight relative to the stylus without rotating the counterweight.

A yet further object of the present invention is to provide a tone arm assembly, wherein a rear counterweight mounted on the tone arm is effectively decoupled from the tone arm by supporting the counterweight entirely on a resilient material positioned between the counterweight and support collar extending therethrough.

Each of these objects is achieved in a preferred embodiment of the present invention, wherein a tone arm assembly includes a sub-assembly having a pivot pin extending therefrom. The pin pivotally engages a cup-shaped recess formed on a support member, with the pivot point falling within a horizontal line intersecting the center of gravity of the tone arm sub-assembly and extending perpendicular to an axis extending through the sub-assembly from a pick-up cartridge positioned at one end to a rear counterweight positioned at an opposite end. The tone arm assembly further includes a pair of aligned, lateral counterweights attached to opposite side portions of the tone arm sub-assembly, with the center of gravity of the lateral counterweights positioned vertically beneath the pivot point of the tone arm sub-assembly. The lateral counterweights are preferably arranged such that a vertical plane intersecting the counterweights extends substantially parallel to the longitudinal or major axis of the stylus and perpendicular to the stylus cantilever. The tone arm sub-assembly also includes a pair of concentrically positioned tubular tone arms having a plurality of spaced, acoustic dampeners extending therebetween. Preferably, the acoustic dampeners are irregularly spaced from one another to absorb vibrations over a wide spectrum of frequences. A silicone fluid may be positioned between adjacent dampeners to further reduce resonances from developing within the tone arm. The unipivot bearing assembly is immersed in a container of heavy silicone-like fluid which lubricates the pivot contact surfaces to reduce the force necessary for pivoting the tone arm assembly relative to the support member, and provides effective damping of any remaining resonances which may be present. In particular, the fluid helps damp the low-frequency resonance peak which is present in all tone arms as a result of the interaction between the tone arm effective mass and the compliance of the stylus assembly, referred to as the CM resonance (Compliance × Mass). The fluid also provides for improved arm tracking on warped records by applying controlled resistance to rapid vertical arm motion due to warps. This prevents the stylus from alternately digging into the record surface on the bottom of a warp, or from leaving the surface of the record on the top of the warp, as in the tendency with any undamped tone arm pivot. During normal arm motion, this damping resistance is effectively nil and does not impede the performance of the arm.

The present invention also includes a uniquely constructed rear counterweight assembly adaptable for removable attachment to a tone arm housing assembly. A cylindrical counterweight is supported on a band or ring of dampening material such as material sold under the tradename Sorbothane. The band is mounted on a carrier assembly adjustably mounted on a shaft forming a portion of the tone arm. A rack and pinion drive assembly is conveniently employed for adjusting the distance between the rear counterweight and the stylus. Because the counterweight assembly is easily removed from the tone arm, counterweights of varying weight can be employed dependent on the weight of the phonograph cartridge.

In a further embodiment, a uniquely constructed counterweight support assembly which includes a relatively thin ring of elastically deformable material positioned within a groove formed in an aperture extending transversely through a center portion of the counterweight is employed with the tone arm assembly. The deformable ring contacts a support collar extending through the counterweight, with the deformable ring providing the entire support for the counterweight. As a result, the counterweight tends to resonate at substantially the same frequency as the CM resonance of the pick-up cartridge, discussed hereabove. This, in turn, significantly improves the tracking performance of the tone arm assembly, reduces the chance of low-frequency overload and generally improves the lower frequency reproduction of the tone arm. In yet a further embodiment, the single ring of elastically deformable material is replaced by a plurality of deformable plugs which are fixedly attached to the support collar and which extend into radial apertures formed in the counterweight. By adjusting the degree of compression of the deformable plugs, it becomes possible to alter or tune the resonance of the counterweight to compensate for the different resonant frequencies generated by various pick-up cartridges. The greater the amount of compression of each deformable plug in the direction of the collar, the higher the resonant frequency of the counterweight. As the plugs are allowed to extend radially outward through the counterweight, the resonant frequency of the counterweight will decrease.

A further, distinctive feature of the present invention is a method of and apparatus for properly installing the tone arm assembly on a turntable, as well as properly installing the stylus on the tone arm. In particular, a base plate assembly supporting the tone arm assembly is fixedly mounted on the turntable. By selectively rotating a leadscrew extending from the base plate assembly, it becomes possible to alter the position of the tone arm assembly until an opening in the empty headshell is vertically aligned with a fixture removable mounted on the turntable spindle. When the tone arm assembly is properly aligned, lowering the tone arm will result in a portion of the mounting fixture entering the opening formed in the headshell.

Once the tone arm assembly is properly positioned relative to the turntable, the tone arm can be disconnected to allow for installation of the pick-up cartridge on the headshell. An alignment fixture is brought into abutment with the head-shell and adjusted until the stylus tip aligns with a predetermined mark on the alignment fixture. By carefully adjusting the position of the cartridge, it also becomes possible to align the stylus cantilever with a predetermined mark on the alignment fixture. Ater the pick-up cartridge is properly aligned, it is fixedly attached to the headshell by tightening conventional fastening screws or the like.

The present invention will become apparent from a reading of the following specification and claims, together with the accompanying drawings, wherein similar elements are referred to and are indicated by similar reference numerals.

BRIEF DESCRIPTION OF THE DRAWINGS

In order to obtain a better understanding of the present invention, reference is made to the accompanying drawings, wherein:

FIG. 1 shows a side view of a tone arm assembly formed in accordance with an embodiment of the present invention;

FIG. 2 shows a top view of a tone arm assembly of FIG. 1;

FIG. 3B shows a partial cross-sectional view of a modified support assembly;

FIG. 4 shows a cross-sectional view of a forward portion of the tone arm of FIG. 1 taken between the section ends A—A';

FIG. 6 shows a further side view of the tone arm assembly and associated anti-skate mechanism attached thereto;

FIG. 7 shows an exploded view of the bearing mount assembly employed in the anti-skate mechanism shown in FIG. 6;

FIG. 9 shows a partial side view of a tone arm assembly formed in accordance with an alternative embodiment of the present invention;

FIG. 20 shows an exploded view of an anti-skate employed in the preferred embodiment of FIG. 12;

FIG. 21 shows a blown-up perspective view of a portion of the tone arm assembly and attached anti-skate mechanism employed in the embodiment of FIG. 12;

FIG. 22 shows an exploded view of a preferred tone arm support assembly employed with the embodiment of FIG. 12; and, FIG. 23 shows a cross-sectional view taken along the section G—G in FIG. 22.

DETAILED DESCRIPTION OF THE PREFERRED EMBODIMENT

Figure 8:
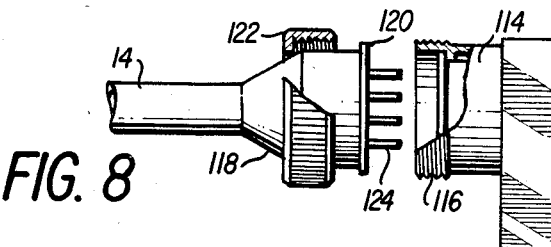
FIG. 8 shows a partial side view of a quick-release coupling assembly employed in the embodiment of FIG. 1, with the coupling assembly being in the disconnected mode.

Rreferring to the drawings, and to FIG. 1 in particular, a tone arm assembly formed in accordance with the present invention is generally designated at 10. Tone arm assembly 10 includes a housing assembly 12 having an arm 14 extending generally perpendicularly therefrom. Housing assembly 12 is adjustably supported above a frame portion 16 of a phonograph assembly or the like in a manner to be explained in detail hereafter.

Referring to FIG. 4, arm 14 includes an outer, tubularly shaped member 18, and an inner, tubularly shaped member 20 extending concentrically therethrough. Tubular member 20 is formed with an outer diameter which is less than the inner diameter of tubular member 18, allowing a plurality of band-shaped acoustical dampening members 22 to be positioned between inner and outer tubular members 18 and 20, respectively. Dampening members 22 serve the dual purpose of maintaining the tubular members 18 and 20 in their proper concentric alignment as well as suppressing resonances from being transmitted through arm 14. In a preferred embodiment, bands 22 may be formed of an energy absorbing material such as sold under the tradename "Sorbothane". Alternatively, the bands could each be formed from a single piece of any conventional rubberlike material positioned between tubular members 18 and 20. Furthermore at least some of the bands are preferably spaced from one another at irregular distances of between one-to-two inch intervals to minimize the build-up of resonance nodes. A layer of silicone-like rubber material can be injected into the gaps formed between adjacent bands 22 to further supress resonances, as well as to allow for easy assembly of arm 14.

Referring to FIGS. 1 and 2, an end portion of pick-up arm 14 fixedly engages a cartridge support member or head shell 24. For reasons which will become clear, head shell 24 must be both strong as well as lightweight. As a result, headshell 24 may be made of a material such as machined aluminum, or a moulded resin compound such as Dupont "Rynite". Head shell 24 includes a sleeve-shaped end portion 26 which surrounds and engages pick-up arm 14. At least one web-shaped gusset 28 extends between a first leg portion 30A and a second leg portion 30B attached thereto. Leg portion 30A joins end portion 26 and extends vertically when the tone arm assembly 10 is mounted so the arm 14 extends generally horizontally above pick-up arm 14, with leg portion 30B extending substantially parallel to arm 14. As best shown in FIG. 2, leg portion 30B includes a first section 32 which joins leg portion 30A, and a second section 34 which forms an oblique angle with section 32. Finally head shell 24 includes a raised end portion 36 integrally attached to section 34 and having a curved lower surface to allow an operator to easily grasp and lift end portion 36 and attached arm 14 from a record surface, not shown. A plurality of apertures 38 extend through leg portion 30B of headshell 24 in order to minimize the overall weight of head shell 24. The L-shaped configuration of headshell 24 is specifically chosen such that the center of gravity of the pick-up cartridge is horizontally aligned with the center of gravity of arm 14 and a counterweight 136 for reasons which will become clear hereafter. The procedure of aligning the stylus tip during initial installation of the cartridge will be discussed in detail in a further portion of the specification.

Figure 3A:
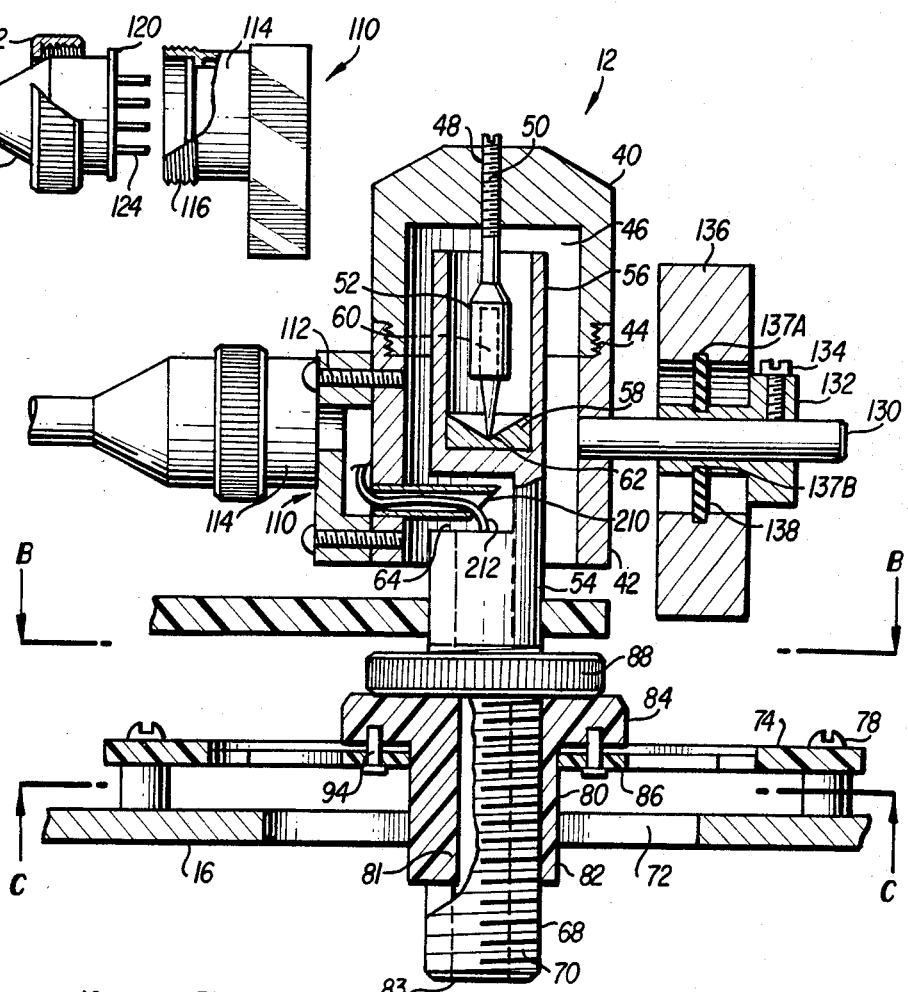
FIG. 3A shows a partial cross-sectional view of the tone arm support assembly of FIG. 1.

Turning now to FIG. 3A, a cross-sectional view of housing assembly 12 is shown. Housing assembly 12 encloses and supports a unipivot bearing assembly capable of supporting tone arm assembly 10 when pivoted through a vertical plane as may occur during the tracking movement of arm 14 across a warped record surface without generating adversely directed restoring forces. In particular, housing assembly 12 includes a substantially cup-shaped cap member 40 and a separate, sleeve-shaped body member 42 positioned adjacent thereto. Each of the members 40 and 42 includes a plurality of complementary thread 44 formed along confronting end portions in order to threadedly attach members 40 and 42 to each other. Inner wall surfaces of members 40 and 42 enclose and form a hollow chamber 46 which extends longitudinally through a substantial portion of housing assembly 12. In addition, cap member 40 further includes a threaded aperture 48 extending therethrough, with aperture 48 being aligned with a longitudinal axis through a center portion of cap member 40. Finally, a pin member 50 includes a threaded end portion extending within aperture 48 and a further, cylindrically-shaped hollow end portion 52 extending through a portion of chamber 46.

A support shaft 54 extends vertically above frame portion 16 of the phonograph assembly and includes an elongated, cup-shaped end portion 56 positioned within chamber 46 such that end portion 56 surrounds the hollow end portion 52 of pin member 50. The cup-shaped end portion 56 includes a conical end surface 58 having a cup-shaped recess 62 formed in a radially central portion thereof. Furthermore, a pivot pin member 60 includes a cylindrically-shaped end portion extending within the hollow end portion 52 of pin 50 and further includes a tapered end portion pivotally engaging recess 62 as best shown in FIG. 3A. In a preferred embodiment of the present invention, both pivot pin 60 and conical end surface 58 are formed of an extremely hard material, such as tungsten carbide, thereby allowing the pivot assembly to be polished to a smoothness comparable to sapphire but with increased load and shock capability. A heavy-weight silicone type fluid is introduced into cup-shaped end portion 56 to a level sufficient to immerse the tapered end portion of pivot 60 therein. The silicone fluid functions to reduce the friction between the engaging surfaces of pin 60 and recess 62 by forming a thin film of lubricant therebetween. More importantly, the fluid also dampens any resonances introduced into the pivot assembly to improve tracking of warped records as discussed previously.

Figure 10:
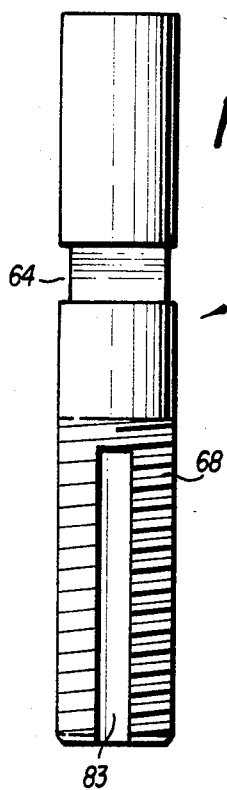
FIG. 10 shows a side view of a portion of the support shaft employed in the embodiment of FIG. 3A.

Support shaft 54 further includes a slot-shaped opening 64 extending through an outer surface portion positioned adjacent to the cup-shaped end portion 56. Shaft 54 is also formed with a threaded end portion 68 positioned opposite from end portion 56, with a hollow passageway 70 extending through end portion 68 as far as slot 64. End portion 68 of shaft 54 extends through an opening 72 formed through frame portion 16 of the phonograph. In order to support shaft 54 in its proper position relative to frame 16, a base plate assembly surrounds shaft 54 and is fixedly attached to frame 16 in a manner to be described. The base plate assembly includes a substantially rectangularly-shaped base plate member 74 formed with an elongated slot 76 extending through a central portion thereof. Base plate 74 is fixedly attached to frame portion 16 via a plurality of conventional connecting fasteners 78. The base plate assembly further includes a bushing member 80 having a hollow sleeve portion 82 of sufficient inner diameter to allow support shaft 54 to extend therethrough. Bushing 80 also includes a flange-shaped end portion 84 integrally attached to and extending radially outwardly from sleeve portion 82. The base plate assembly also includes a slide member 86 formed with a transverse aperture having a diameter sufficient to allow slide member 86 to surround sleeve portion 82 of bushing 80. Bushing 80 also includes a rib-shaped portion 81 which extends radially inwardly into a slot-shaped opening 83 formed in an outer surface of end portion 68, and best shown in FIG. 10. As a result, rib portion 81 prevents shaft 54 from rotating during vertical and horizontal adjustment thereof.

A vertical adjustment member 88 comprises a thumb screw formed with a threaded central opening which surrounds and mates with the threaded end portion 68 of support shaft 54. By rotating screw 88 in either the clockwise or counterclockwise direction, shaft 54 is caused to move in a longitudinal direction therethrough. As a result, housing assembly 12 is either raised or lowered relative to frame 16.

In an alternative embodiment shown in FIG. 3B, a locking mechanism is shown for preventing accidental movement of shaft 54 relative to bushing 80. In particular, a threaded aperture 85 extends substantially radially through end portion 84 of bushing 80. A plug 87 formed of a nylon-like material is positionable within aperture 85 and can be forced against end portion 68 of shaft 54 by introduction of a set screw 89 into aperture 85. Set screw 89 may be selectively advanced through aperture 85 until plug 87 is pressed against end portion 68 with a force sufficient to prevent accidental movement of the shaft. It is to be noted in the embodiment of FIG. 3B that rib portion 81 and slot 83 have been eliminated, with set screw 89 and plug 87 functioning to prevent misalignment of the tone arm assembly.

Figure 5A:
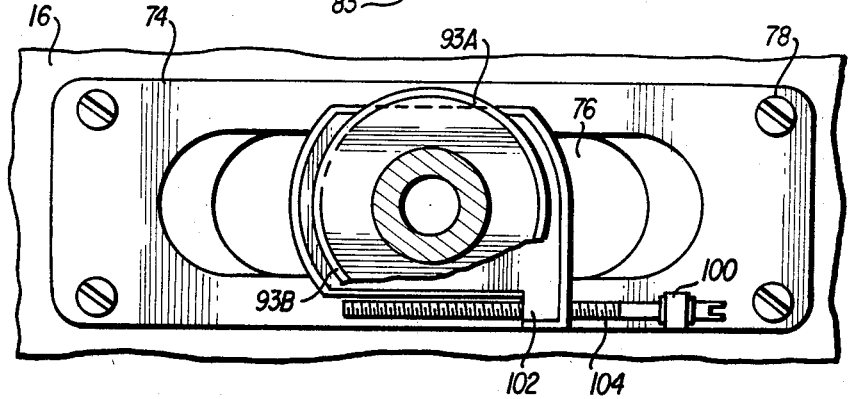
FIG. 5A shows a top view of the tone arm support assembly taken along section B—B of FIG. 3A.
Figure 5B:
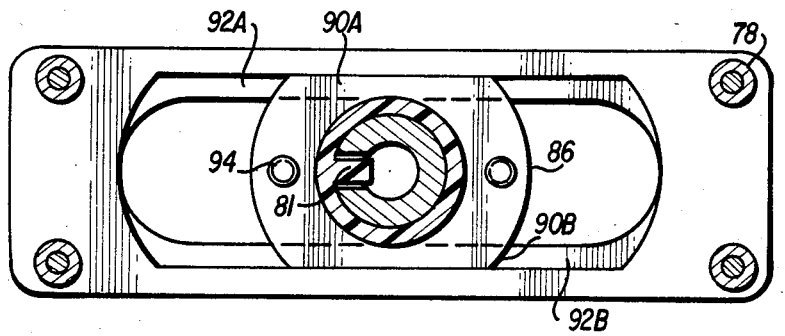
FIG. 5B shows a bottom view of the tone arm support assembly taken along section C—C of FIG. 3A.

Returning now to a discussion of the embodiment shown in FIGS. 3A, 5A and 5B, slide member 86 and flanged end portion 84 of bushing 80 overlap opposite sides of slot 76, with a pair of connecting pins 94 extending between and fixedly engaging slide 86 and flange 84 to one another. In particular, slide member 86 includes a pair of lower lip portions 90A and 90B which engage recessed wall surfaces 92A and 92B formed in a lower side portion of plate 74 on either side of slot 76, while flanged end portion 84 includes a pair of overlapping lip portions 93A and 93B which engage an upper side portion of plate 74 on either side of slot 76. This unique overlapping construction of flanged end portion 84 and attached slide 86 functions to prevent slide 86 from vertically separating from base plate 74, while at the same time allowing slide 86 and flanged end portion 84 to move in a transverse direction along slot 76. A first support sleeve assembly 100 is fixedly mounted on the base plate 74 and a second, threaded support sleeve assembly 102 is fixedly mounted on slide member 86. A connecting pin 104 includes a non-threaded portion extending through the first sleeve assembly 100, with a circumferentially extending groove formed in pin 104 receiving an end portion of a key member extending from sleeve 100. Pin member 104 also includes a threaded end portion extending through the threaded support sleeve assembly 102.

In order to adjust the horizontal position of support shaft 54 relative to base plate 74, it is merely necessary to rotate pin member 104 in either a clockwise or counterclockwise direction. Because of the engagement between the key extending from sleeve 100 and the groove formed in pin 104, pin 104 may rotate relative to sleeve 100 but is constrained from moving in the longitudinal direction relative thereto. In effect, the key and groove connection fixes the position of pin 104 relative to base plate 74. However, because sleeve 102 and pin 104 are threadedly interconnected, rotation of pin 104 results in the horizontal movement of sleeve 102 and attached slide member 86, with the movement of slide member 86 causing a similar movement in bushing 80 and shaft member 54 extending therethrough.

In a further, preferred embodiment of the present invention, bushing 80 and thumb screw 88 are replaced by an alignment assembly generally indicated by numeral 69' in FIG. 22. The alignment assembly includes a generally rectangular mounting block 70' which is slidably mounted on base plate 74 in FIG. 3A. Mounting block 70' includes a pair of openings 71' and 72' sufficient in size to allow a pair of shoulder bolts to pass completely through mounting block 70' and enter a slide member disposed on an opposite of the base plate, such as slide member 86. Such an arrangement allows mounting block 70' to reciprocate in opposite directions coinciding with a longitudinal axis Q—Q extending through mounting block 70'. In order to initiate movement of mounting block 70', a threaded adjustment pin, not shown, is inserted into a threaded bore 75' extending through a portion of mounting block 70' in a direction parallel to longitudinal axis Q—Q. By selective rotation of such a threaded pin, it becomes possible to alter the position of mounting block 70' relative to its fixedly positioned base plate.

Mounting block 70' functions to support a tone arm support shaft in a manner to be explained. In particular, mounting block 70' includes a cavity 80' having a generally rectangular configuration. Cavity 80' includes an end surface 81' extending parallel to longitudinal axis Q—Q and located along a plane substantially bisecting mounting block 70' into two equal portions. End surface 81' includes a semi-cylindrical portion 82' extending outwardly from cavity 80', with surface portion 82' having a radius of curvature substantially equal to a radius of curvature of a tone arm support shaft, not shown. Slidably disposed within cavity 80' is a clamping block 83' having a semi-cylindrical surface portion 84' aligned with and extending away from surface portion 82' of cavity 80'. By carefully sizing confronting surface portions 82' and 84' to form a cylindrical opening, it becomes possible to insert a tone arm support shaft completely through mounting block 70'. Clamping block 83' is pressed into frictional engagement with such a tone arm support shaft by appropriate rotation of a set screw 85' extending through mounting block 70' and into contact with clamping block 83'.

When it becomes necessary to alter the vertical position of a tone arm support shaft clamped within mounting block 70', it is only necessary to rotate set screw 85', allowing a pair of biasing springs 86' and 87' to press clamping block 83' away from end surface 81' of cavity 80'. Each biasing spring extends between a separate bore formed in clamping block 83' and a portion of end surface 81'. However, it is understood that each bore could be formed in end surface 81' rather than in clamping block 83'. The clamping block 83' is preferably formed of nylon or the like, which will not scratch or mar the tone arm support shaft.

Referring to FIG. 3a, a hollow attachment assembly 110 is connected to a side portion of body member 42 via a plurality of bolt-like connecting members 112. Attachment assembly 110 includes a hollow, hub-shaped end portion 114 extending perpendicularly away from housing assembly 12 and having a plurality of threads 116 formed along an outer surface portion thereof as best shown in FIG. 8. Pick-up arm 14 includes a conically-shaped end portion 118 which is formed with an outer diameter slightly less than the outer diameter of hub-shaped end portion 114. End portion 118 includes an end surface having a radially directed flange 120 extending circumferentially thereabout, with a rotatable locking ring 122 also surrounding end portion 118. Locking ring 122 includes an inner diameter having a plurality of threads which complement the threads 116 formed on hub-shaped end portion 114. Finally, end portion 118 of pick-up arm 14 encloses and supports a plurality of male electrical connectors 124 which are complementary in shape to a plurality of female electrical connectors supported within hub-shaped end portion 114.

To join pick-up arm 14 to housing assembly 12, the end portion 118 is brought into abutting relationship with hub end portion 114. This, in turn, brings the male electrical connectors 124 into engagement with the corresponding female electrical connectors. The threaded inner diameter of locking ring 122 is then brought into engagement with the threads 116 formed on hub portion 114. Locking ring 122 is then rotated onto hub portion 114 until an inner flange formed on locking ring 122 contacts stop flange 120 formed on end portion 118 of pick-up arm 14, thereby preventing further movement of locking ring 122.

Referring again to FIG. 3A, a balancing arm 130 extends perpendicularly from body member 42, with arm 130 being displaced 180° from attachment assembly 110 as measured about the circumference of sleeve member 42. A support collar 132 surrounds a portion of arm 130, with collar 132 including a hub-shaped portion and an integrally attached sleeve-shaped portion. A set screw 134 extends within a radial aperture formed through the hub-shaped portion of collar 132, with set screw 134 being selectively advanced through collar 132 until contact is made with arm 130, thereby fixedly attaching collar 132 to arm 130. A counterweight 136 includes a transverse opening extending through a longitudinal axis thereof, with the transverse opening having a diameter considerably larger than an outer diameter of the sleeve-shaped portion of collar 132. A groove 137A is formed in the inner wall surface of the transverse opening extending through counterweight 136, wherein a preferred embodiment of the present invention groove 137A has a depth of substantially one-sixteenth (1/16) of an inch and a width of substantially one-eighth (1/8) of an inch, respectively. A ring of elastically deformable material 138 is positioned within groove 137A, with ring 138 having a radial inner surface in frictional contact with a similarly shaped groove 137B formed in the sleeve portion of collar 132. Resilient ring 138 provides the sole support for counterweight 136 and is therefore capable of suppressing vibrations from being transmitted between counterweight 136 and arm 130. In one embodiment of the present invention, each of the arms 14 and 130 will share a single longitudinally directed axis extending therethrough. Furthermore, arms 14, 130 and housing 12 form a tone arm sub-assembly having a center of gravity located in a horizontal plane extending through the center of gravity of tone arm 14 as well as counter balance arm 130. By carefully adjusting the position of pin 50 and cup-shaped member 56, the pivot point of the unipivot bearing can be made to coincide with a horizontal line intersecting the center of gravity of the tone arm sub-assembly and extending perpendicular to a longitudinal axis of the tone arm sub-assembly. When such a condition exists, the tone arm sub-assembly has achieved a balanced condition wherein arm 14 can be pivoted in the vertical direction without generating appreciable restoring forces capable of affecting the position of the tone arm sub assembly. Even though counterweight 136 can be moved to apply a tracking force to the pick-up cartridge attached to pick-up arm 14, such a tracking force does not constitute a restoring force as discussed hereabove, in that the tracking force is always directed toward the record surface while the restoring forces act in a direction opposite to the direction in which pick-up arm 14 is pivoted.

An alternative embodiment of the present invention is shown in FIG. 9, wherein a pick-up arm 14' permanently engages an attachment assembly 110' which, in turn, is attached to a housing assembly 12 via fasteners 112. In the alternative embodiment shown in FIG. 9, the counter-balance weight 136 and resilient ring are similar to the weight and ring shown in FIG. 3A. However, the set screw 134 has been eliminated and a collar 132' is formed with a threaded inner surface which corresponds to a threaded outer surface formed on a counterbalance arm 130'. By rotating collar 132' in either the clockwise or counterclockwise directions, both collar 132' and counterweight 136 are moved in a longitudinal direction relative to arm 130'.

Figure 11A:
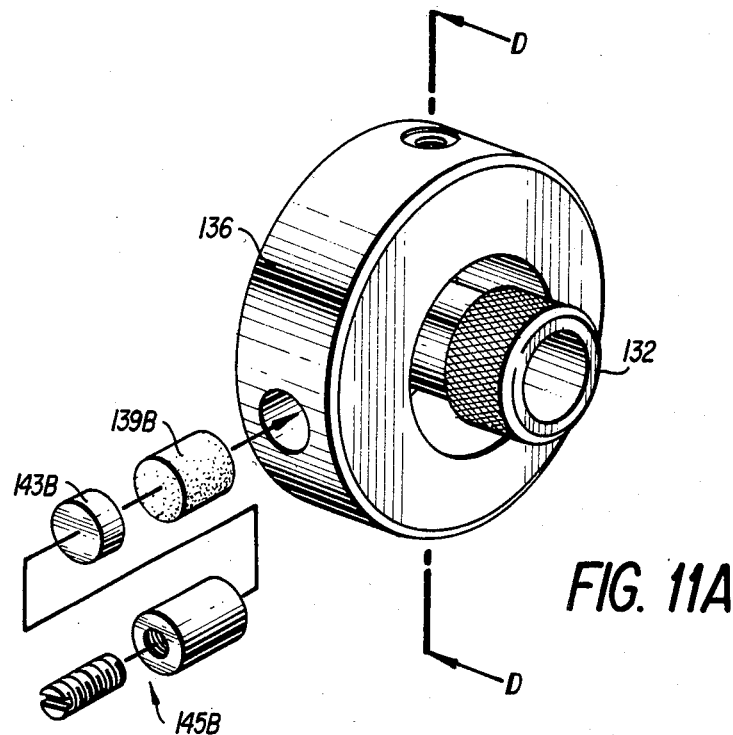
FIG. 11A shows a perspective view of an alternative embodiment of a counterweight assembly formed in accordance with the present invention.
Figure 11B:
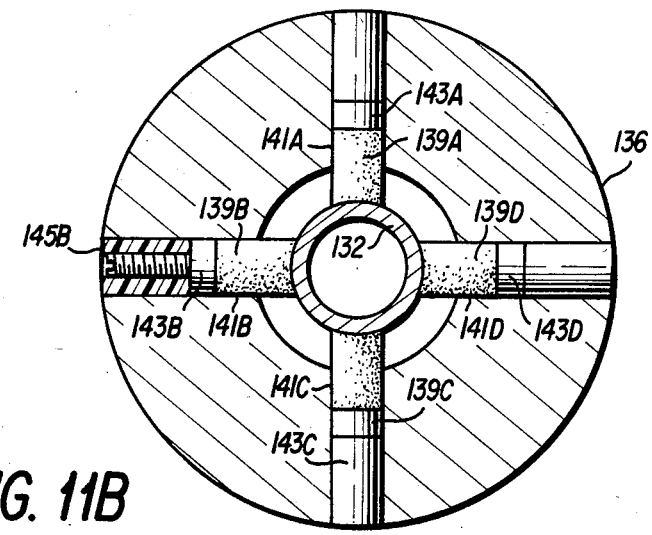
FIG. 11B shows a cross-sectional view of the counterweight assembly taken along the plane D—D in FIG. 11A.

In a yet further embodiment shown in FIGS. 11A and 11B, the grooves 137 A and B and the elastically deformable ring 138 have been eliminated. Rather, a plurality of preferably four cylindrical-shaped deformable plugs 139A-D are each fixedly attached to a sleeve-shaped portion of collar 132. Each of the plugs 139A-D may be circumferentially spaced at an interval of substantially 90° from adjacent plugs, and each of the plugs 139A-D extends into a separate radial aperture 141A-D formed through counterweight 136. In addition, a plurality of cylindrical-shaped nylon plugs 143A-D are each introduced into radial outer end portions of apertures 141A-D. Finally, a plurality of set screw fastener assemblies 145A-D are also introduced into each radially disposed aperture 141A-D, respectively. By rotating the set screws 145A-D in a clockwise direction, end portions of the set screws are advanced into contact with nylon plugs 143A-D. Further clockwise rotation of set screws 145A-D forces the plugs 143A-D to abut and compress deformable plugs 139A-D, respectively. By altering the size of each plug 139A-D, the vibrational dampening characteristics of the plug are also altered, thereby allowing one to alter or tune the resonant frequency of the counterweight in order to compensate for various pick-up cartridges employed with the tone arm assembly. In particular, as the initial size of the plugs 139A-D is reduced by compression of the plugs, the higher the resonant frequency obtainable by the counterweight. Likewise, as the set screws 145A-D are withdrawn, the deformable plugs 139A-D expand and yield the lowest frequency.

The counterweight assembly discussed hereabove in conjunction with FIG. 3A can only work properly if the center of gravity of counterweight 136 coincides with a longitudinal axis of balancing arm 130. If either counter-weight 136 or ring 138 were not "true", rotation of counter-weight 136 would serve to displace the center of gravity of counter-weight 136 from its proper position.

Figure 15:
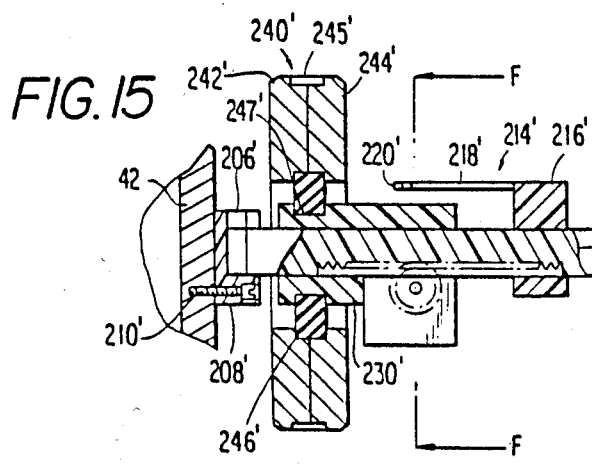
FIG. 15 shows a cross-sectional side view of the counterweight assembly taken along the plane E—E in FIG. 14.

In order to overcome this potentially serious problem, a preferred counterweight assembly 200' shown in FIGS. 12-16 has been carefully constructed to eliminate rotation of the counterweight. As shown in FIG. 15, a balancing arm 202' is attached to a mounting shoe 204', itself attached to sleeve-shaped body member 42. In particular, mounting shoe 204' is formed with a vertically extending, substantially T-shaped retaining pocket 206'. Retaining pocket 206' extends downwardly from an upper surface of shoe 204' to a position approximately three-quarters the distance to a bottom surface of shoe 204'. A further opening 208' extends through the vertically lower portion of shoe 204' in a direction substantially perpendicular to the longitudinal axis of pocket 206'. During assembly, a conventional fastening screw 210' is inserted through opening 208' and into an aligned opening formed in member 42, thus fixedly attaching shoe 204' to member 42.

Balancing arm 202' is preferably formed with a substantially rectangular cross-sectional configuration and includes a T-shaped end portion 212' compatible in size and shape to the T-shaped pocket 206' formed in mounting shoe 204'. However, it is considered within the scope of the present invention to form balancing arm 202' with any conventional cross-sectional shape. Likewise, end portion 212' can be formed of any conventional shape, provided that pocket 206' is formed with a compatible shape to allow insertion of end portion 212' therein.

An indexing cursor 214' is slidable mounted on balancing arm 202' at a location remotely positioned from end portion 212'. Cursor 214' includes a hollow body portion 216' surrounding balancing arm 202' and an elongated rod portion 218' extending parallel to balancing arm 202'. A pointer 220' extends from an end of rod 218' and is conveniently aligned with a graduated scale 222' covering a vertically upper surface portion of balancing arm 202'. Finally, an adjustment screw 224' extends through body portion 216' into frictional engagement with balancing arm 202' to releasably fix the position of cursor 214 relative to scale 222' in a manner which will become clear.

Figure 16:
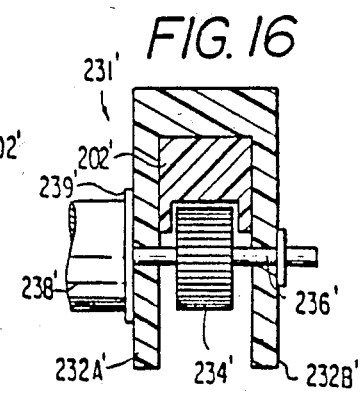
FIG. 16 shows a cross-sectional end view of the counterweight assembly taken along the plane F—F in FIG. 15.

A carrier assembly 230' includes a U-shaped sleeve 231', partial encloses balancing arm 202' as best shown in FIG. 16. Carrier sleeve 231' includes a pair of parallel extending leg portions 232A' and 232B' interconnected by an intermediate portion 232C'. Portions 232A-C' are sized to slidably engage confronting surface portions of balancing arm 202' when the arm is fully inserted into the carrier assembly. A pinion gear 234' is mounted for joint rotation with a drive shaft 236' extending between leg portions 232A' and 232B', respectively. Drive shaft 236' engages an adjusting handle 238' partially shown in FIG. 16 and better shown in FIG. 14. By rotating handle 238' in either a clockwise or counterclockwise direction, it becomes possible to rotate pinion gear 234' in a corresponding direction. A wave-spring washer 239' is inserted between the adjusting handle 238' and carrier leg 232A' to provide locking friction for preventing undesired rotation of pinion gear 234'. Washer 239' may be formed of metal, Teflon or any conventional material. Furthermore, washer 239' can be located on any convenient portion of drive shaft 236', providing that washer 239' contacts a relatively fixed surface to provide a frictional braking force.

A hollow, cylindrically-shaped counterweight 240' surrounds an end portion of carrier assembly 230' confronting mounting shoe 240'. Counterweight 240' may be formed as a single member, or counterweight 240' may comprise a pair of ring-shaped members 242' and 244' disposed side-by-side as shown in FIG. 15. If two members are employed, a clamping ring 245' is preferably inserted in facing groves extending about the circumference of each member. Regardless of whether one, two or a plurality of members are employed to form counterweight 240', the entire counterweight is supported on a ring of energy absorbing material 246' mounted in a groove 247' formed in an outer surface carrier assembly 230'. Preferably, ring 245' is formed of an energy abosrbing material of the type sold under the tradename "Sorbothane", however, it is within the scope of the present invention to employ any conventional energy absorbing material.

In order to alter the position of counterweight 240', a lower surface of balancing arm 202' includes a rack gear 248' adaptable for intermeshing with pinion gear 234'. By appropriate rotation of handle 238', drive shaft 236' and pinion gear 234' relative to rack gear 248', it is possible to adjust the position of the carrier assembly and counterweight mounted therein along the relatively fixed balancing arm 202'.

To properly calibrate counterweight assembly 200', it is necessary to first adjust the position of counterweight 240 until the tone arm achieves a zero balanced position. Such a zero balanced position is characterized by the tone arm maintaining a rest position when left on its own. Once zero balance is achieved, the indexing cursor 214' is slid along balancing arm 202' until pointer 220' is vertically aligned with a graduated scale marking of zero (0). In order to apply a positive tracking force to the tone arm stylus, it is merely necessary to rotate handle 238' and thereby adjust the position of carrier assembly 230' and counterweight 240' along balancing arm 202' in a direction toward member 42 and away from indexing cursor 214'. After carrier assembly 230' has moved a predetermined distance, the pointer will become aligned with a numeral, typically one (1) to three (3) on graduated scale 220'. This position may conveniently correspond to the required tracking force in grams depending on the measuring scale employed.

One of the distinctive advantages of counterweight assembly 200' is the ability to quickly alter the particular counterweight employed as may be required by the weight of the pick-up cartridge. Depending on the weight of the pick-up cartridge (often between 2.5 and 20 grams) it is now possible to employ one of several counterweights by merely removing a first counterweight assembly and substituting a second, entirely separate counterweight assembly. In conventional assemblies employing a single counterweight, the weight may have to be positioned a considerable distance from the pivot point to properly balance the phono cartridge. Such an arrangement significantly increases the overall inertia of the tonearm assembly. In comparison, the ability to change counterweights as with the present invention allows for positioning of the properly chosen weight much closer to the pivot point, thereby minimizing the inertia of the system.

In order to provide sideways or lateral stability for the tone arm sub-assembly shown in FIGS. 1, 2 and 6, respectively, a pair of lateral counterweights 144 and 146 are mounted on a pair of threaded shafts 148 and 150, with the shafts extending in perpendicular directions from opposite side portions of body member 42. In particular, each shaft 148 and 150 extends within a plane which is bisected by a longitudinal axis extending between pick-up arm 14 and counter-balance arm 130. Furthermore, shafts 148 and 150 are aligned with one another and are attached to a portion of body member 42 such that the center of gravity of the counterweights 144 and 146 is located on a line extending vertically beneath the pivot point formed by pivot pin 60 and recess 62. As a result, a beam-balance mounting system is achieved with respect to sideways or lateral pivoting movement of housing assembly 12 and attached pick-up arm 14. This means that any sideways pivoting movement of pick-up arm 14 toward either of the counterweights 144 or 146 generates a restoring force which attempts to return pivot pin 60 to its initially vertical position. Furthermore, the restoring forces generated by counterweights 144 and 146 do not appreciably affect the vertical pivoting movement of the tone arm sub-assembly as occurs during vertical tracking over a record surface. In an embodiment of the present invention, both of the counterweights 144 and 146 are concentrically mounted on their respective shafts 148 and 150. However, it is considered within the scope of the present invention to eccentrically mount each of the counterweights 144 and 146, provided the center of gravity of the resulting assembly is located on a line extending vertically beneath the pivot point of the unipivotly supported tone arm sub-assembly.

Figure 12:
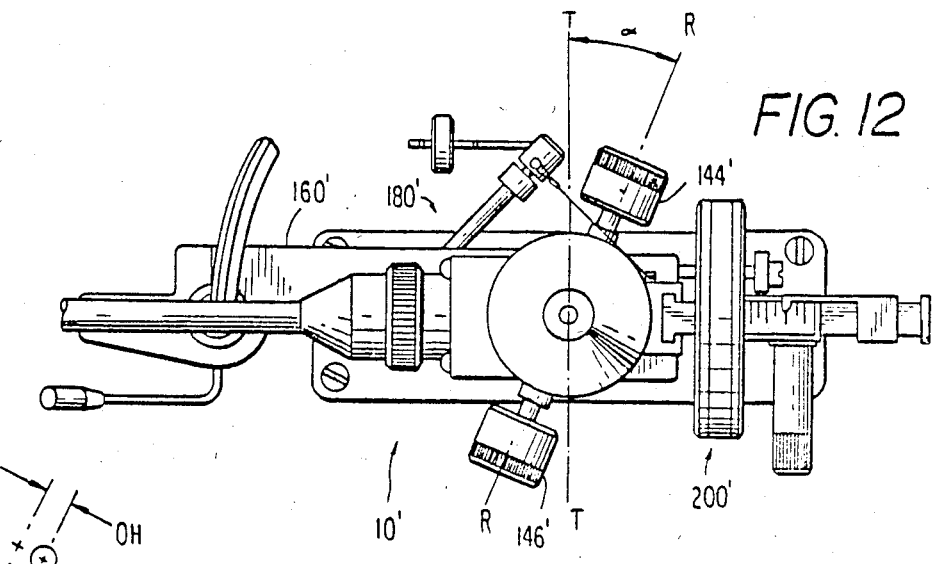
FIG. 12 shows a partial top view of a tone arm assembly formed in accordance with a preferred embodiment of the present invention.

In a preferred embodiment of the tone arm sub-assembly shown in FIG. 12, a pair of counterweights 144' and 146' are disposed along an axis R—R extending intersecting a line vertically beneath the center of gravity of a tone arm sub-assembly 10'. In order to prevent the stylus, not shown, from rolling when vertically tracking over a warped record surface, it is necessary to displace axis R—R from a transverse axis T—T by an angle $\alpha$. Angle $\alpha$ is identical to the offset angle $\alpha$ the stylus cantilever, aligned with axis S—S in FIG. 2, is displaced from the longitudinal axis Y—Y of the tone arm assembly also shown in FIG. 2. In effect, lateral counterweight 146' and counterweight 144' are each displaced by an angle as measured in a clockwise direction from traverse axis T—T. The precise angle $\alpha$ is inversely related to the actual distance measured between a vertical plane extending through the stylus tip and a further vertical plane extending through the pivot assembly in the center of the housing assembly. For example, if the actual distance is measured to be 240 mm, angle $\alpha$ should be 22.9°. In comparison, for a distance of 235 mm, angle $\alpha$ becomes 23.4°. Thus, $\alpha$ is determined by the location of the stylus tip relative to the pivot point. The axis R—R is then arranged to be perpendicular to the axis S—S defined by the angle $\alpha$. By pivoting the counterweights 144' and 146' by an angle $\alpha$ as shown in FIG. 12, the vertical pivoting plane for counterweights 144' and 146' extends parallel to a major axis through the pick-up cartridge and perpendicular to the stylus cantilever. As a result, the stylus is maintained in its correct, upright position at all times when vertically tracking over even a warped record surface. In comparison, lateral counterweights extending tranversely to the longitudinal axis of a tone arm sub-assembly cannot preven the tone arm from rolling in a transverse direction as the stylus moves in a vertical direction along warped record surface. The distinctive advantage of displacing the axis of the lateral counterweights as set forth hereabove thus becomes immediately apparent in maintaing an upright position of the stylus of the vertical tracking movement.

As shown in FIG. 3a, a holder assembly 160 preferably formed of aluminum material surrounds and is fixedly attached to support shaft 54 at a position adjacent to slot 64. Holder assembly 160 provides a support for an anti-skate mechanism, a manual arm-life assembly, and an arm rest assembly all attached thereto. In particular, holder assembly 160 includes a forward portion 161 extending substantially parallel to and spaced beneath pick-up arm 14 when pick-up arm 14 is in a rest position. Forward end portion 161 includes a horizontal leg portion 162 extending substantially perpendicular thereto, such that leg portion 162 and support shaft 148 extend substantially parallel to one another when shaft 148 is in the rest position. Leg portion 162 includes a vertically extending flange 164 attached to an end portion thereof, with flange 164 extending substantially parallel to shaft 54. It is noted from FIG. 2, that flange 164 is inclined at an angle to a longitudinal axis ZZ extending through leg portion 162. Flange 164 further includes an aperture 166 extending transversely through an upper end portion thereof, with a threaded screw 168 rotatably supported within aperture 166. As shown in FIG. 7, a miniature precision bearing assembly 170 is mounted on threaded screw 168, with a ring-shaped sleeve 172 rotatably mounted on bearing assembly 170. A washer member 174 is also mounted on screw 168, such that washer 174 is located between bearing assembly 170 and flange 164. Ring-shaped sleeve 172 includes a pair of apertures 176 and 178 being circumferentially spaced 90° from one another. A first pin member 180 is supported within aperture 176, while a second pin member 182 is supported within aperture 178. Each of the pin members 180 and 182 extend outwardly from ring-shaped member 172 in a substantially radial direction. A notch 184 is cut in a radially outer end portion of pin 180 and a counterweight 186 mounted on pin 182 is adjusted via a set screw 188 extending through an aperture 190 in the counterweight and into frictional contact with pin 182. Finally, a thread 192 of polyester-like material includes a first end portion fixed within notch 184 of pin 180 and a second end portion fixed about counter-balance arm 130.

The operation of the anti-skate mechanism is best shown in FIG. 6, wherein the anti-skate mechanism has been illustrated at three positions which occur during operation of the tone arm assembly 10. In particular, when pick-up arm 14 is in the rest position, the pin and counterweight assume a position substantially as designated at 180" and 186", respectively. As pick-up arm 14 is pivoted to bring the stylus into contact with the beginning of the record, the anti-skate mechanism moves to the positions designated at 180' and 186' due to the pull of thread 192 on pin 180. Finally, as the stylus approaches the end of the record, the anti-skate mechanism assumes the position designated at 180 and 186, respectively. By carefully adjusting the position of counterweight 186 on pin 182, an anit-skate force is generated which tends to maintain the tone arm assembly 10 in its proper lateral position relative to the record surface, not shown. Because of the rolling action of the thread 192 against the outer surface of housing assembly 12, the friction developed between the thread and the housing is effectively non-existant. It is to be noted that thread 192 should extend in substantially the same horizontal plane which includes the pivot point of the unipivot bearing assembly when the anti-skate mechanism assumes the position 180 and 186 to prevent tone arm assembly 10 from twisting about shaft 54.

A further, preferred embodiment of an anti-skate mechanism employed with present invention is shown in FIGS. 12 and 20. In the embodiment of FIG. 12, leg portions 162 and 164 have been eliminated. Rather, a biasing bearing holder 180' is threaded directly into a holder assembly 160'. As shown in detail in FIG. 20, bearing holder 180' includes a threaded end portion 181'; and a cup-shaped end portion 182' oppositely disposed therefrom. A ball bearing assembly 183' is pressed into a cavity 148' defined by cup-shaped end portion 182'. An attachment screwn 184' extends through a central opening 185' in bearing assembly 183' and is threaded into engagement with a bias bearing collar 186', thereby aligning collar 186' with holder 180'. Collar 186' has a substantially cylindrical configuration and includes a pair of circumferentially spaced apertures 187' and 188' formed in outer surface portions thereof. Preferably, apertures 187' and 188' are circumferentially spaced substantially 90° from one another in a manner similar to apertures 176 and 178 formed in sleeve 172 in the embodiment of FIG. 7. A first lever 189' extends outwardly from opening 187', while as second lever 190' extends outwardly from opening 188'. Each lever includes a threaded end portion adaptable for engaging threads formed in a respective opening. Furthermore, opening 188' preferably forms an angled trajectory, such that an acute angle of less than 90° is formed between second lever 190' and a longitudinal axis of folder 180'. A substantially cylindrical counterweight 191' is mounted such that second lever 190' extends completely through an axial passageway 192' formed through counterweight 191'. A spring-loaded ball plunger 193' extends through a radial opening in counterweight 191' and frictional contacts lever 190' to prevent undesirable slippage of counterweight 191'. A pair of notches or grooves 194A' and 194B' formed in spaced portions of lever 190' provide end adjustment positions for counterweight 191'. As counterweight 191' is moved along lever 190', the spring-pressed plunger provides rolling resistance. When either of the grooves 194A' or 194B' are encountered, the plunger is spring pressed into the groove to prevent further movement of the counterweight.

The first lever 189' includes a notch or groove 195' formed at a location remotely disposed from collar 186', with notch 195' receiving a thread of polyester-like material 196' extending from shoe 204'. An opposite end of thread 196' is retained in a boss 197' attached to mounting shoe 204'. Boss 197' includes a slotted opening 198' sufficient in size to allow insertion of thread 196' and yet of insufficient size to allow passage of an aluminum crimp 199' attached to thread 196'.

A manual arm lift assembly is generally designated at 194, and includes a vertical lift member 196 and a horizontally extending support surface 198 attached thereto. A control arm 200 is attached to the vertical lift member 196 through a conventional cam arrangement such that selective pivotal movement of control arm 200 results in the vertical movement of lift member 196 and attached surface 198, thereby raising pick-up arm 14. A substantially L-shaped rest member 202 extends parallel to pick-up arm 14 and includes an end portion attached to the forward portion 161 of holder assembly 160. Rest member 202 includes a cradle-shaped end portion having a flap 204 hinged thereto. Flap 204 and cradle end portion surround and enclose pick-up arm 14, with flap 204 being pivoted to an upright position to allow for removal of pick-up arm 14 from rest member 202.

Turning again to FIG. 3A a hollow conduit 210 is shown to extend axially through a portion of sleeve member 42 and slot 64. Conduit 210 surrounds and supports a portion of signal wire generally designated at 212 which extends from the stylus, through inner tubular member 18, attachment assembly 110 and conduit 210. The wire then travels through the hollow passageway 70 formed in shaft 54. In a preferred embodiment of the present invention, a heavy duty signal wire, for example 30 gauge wire, may be employed within tubular member 18, while a much lighter weight litz-type wire, for example 44 gauge, may be employed within attachment assembly 110 and conduit 210 to significantly reduce the overall drag effect of the wire on the pivotal movement of pick-up arm 14. While 30 gauge and 44 gauge have been cited as examples of the type of wire employed, it is within the scope of the present invention to employ any conventional gauge signal wire for transmitting through the tone arm assembly. For example, the Litz-type wire may be replaced with 5 twisted strains of 44 gauge wire.

Shaft member 54 may be formed of a material such as brass, while the upper section 40 of housing 12 may conveniently be formed of either plexiglass, aluminum or a resin-based plastic compound such as sold under the trade name "Rynite", with the lower section 42 of housing 12 being formed of aluminum. However, a variety of other, similar type materials may be employed for housing 12 as well as shaft 54.

The present invention also provides a unique apparatus and method for properly installing the tone arm assembly as well as the pick-up cartridge. It is assumed that the effective length of the tone arm, i.e. the distance along an imaginary line drawn between the horizontal pivot and the stylus tip is known. It is further assumed that the offset angle, i.e. the angle between the longitudinal axis of the stylus cantilever and imaginary line defining the effective length is known. Finally, it is assumed that the overhang, i.e. the distance the stylus tip should extend beyond the turntable spindle is known. Even though these geometrical relationships are easily determinable for a specific tone arm assembly, many conventional tone arm makers fail to provide sufficient information on how to precisely install the tone arm and its pick-up cartridge. In comparison, the present invention provides a quick and highly accurate procedure for installing the tone arm with minimum error.

Figure 17:
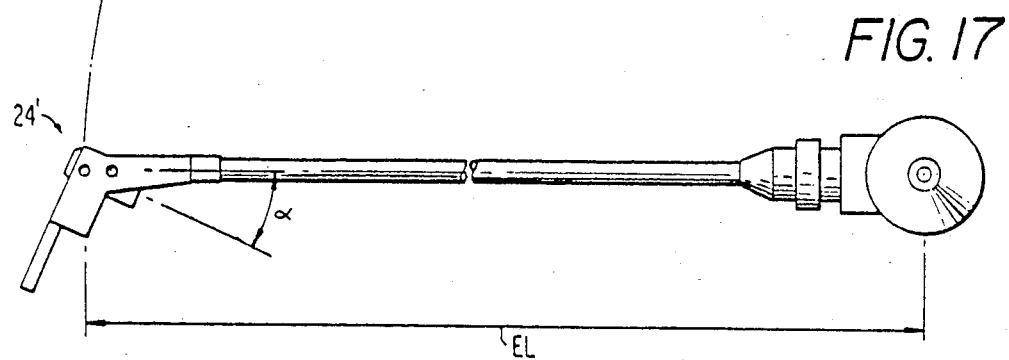
FIG. 17 shows a top view of the tone arm assembly during installation.
Figure 18:
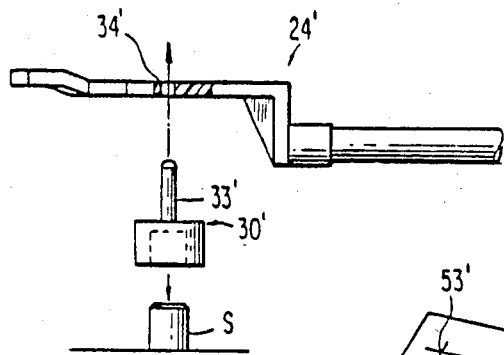
FIG. 18 shows an exploded view of the tone arm installation assembly.
Figure 19:
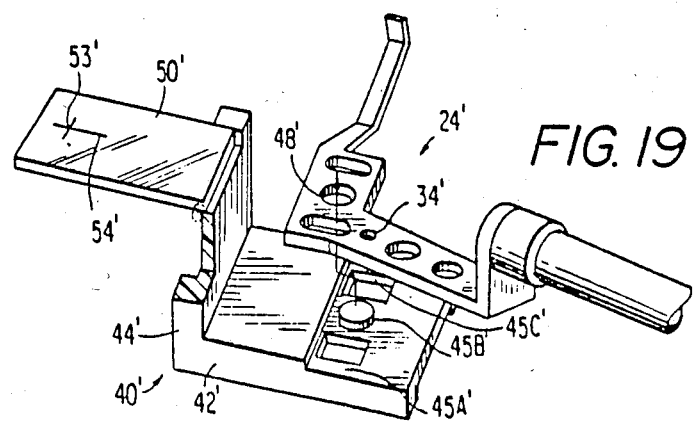
FIG. 19 shows a perspective view of the stylus alignment assembly adaptable for aligning the pick-up cartridge in a tone arm headshell.
Figure 13:
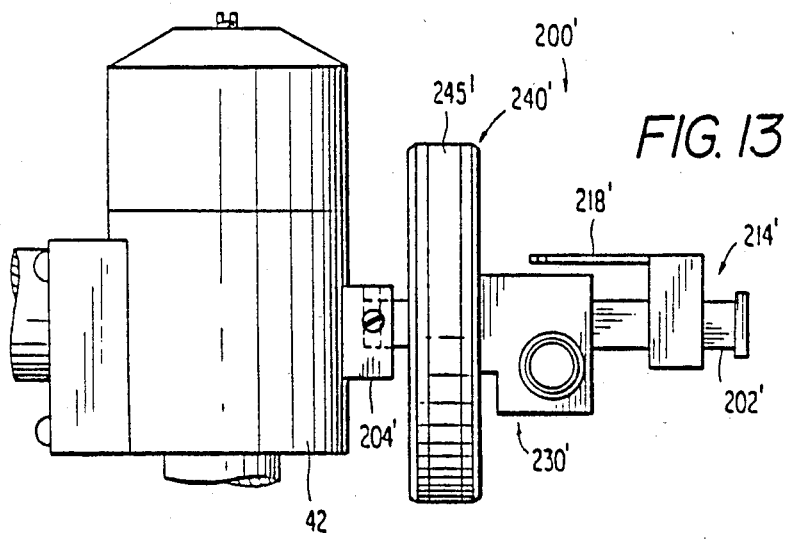
FIG. 13 shows a side view of a further counterweight assembly adaptable for use with the present invention.
Figure 14:
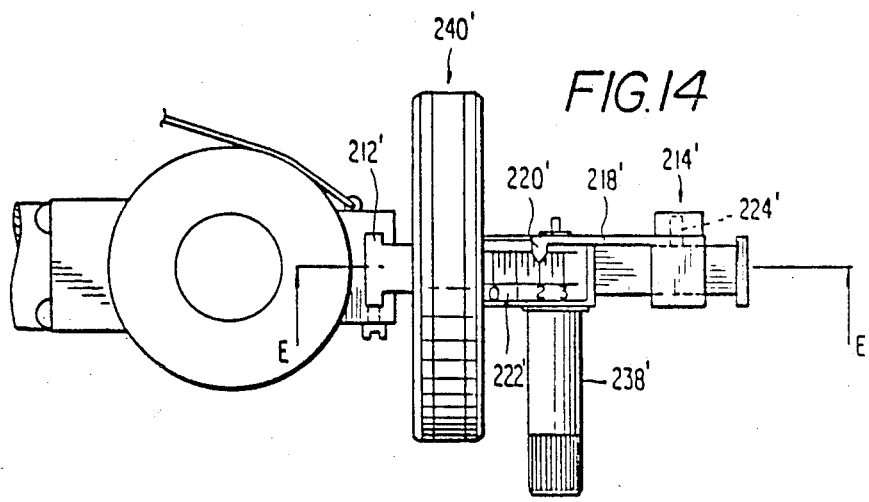
FIG. 14 shows a top view of the counterweight assembly of FIG. 13.

For purposes of explanation only, it may be assumed that the tone arm assembly shown in FIGS. 17–19 has the following dimensions: effective length 235 mm, offset angle of 23.5°, and overhang of 17.638 mm. For purposes of explanation, the effective length is designated EL, the offset angle is designated angle α and the overhand is designated OH.

An alignment nipple 30' includes a body 31' having cylindrically-shaped opening 32' sufficient in size to allow nipple 30' to be inserted on a spindle S extending from a turn table, not shown. A pin-shaped projection 33' extends from body 31' in a direction coinciding with the longitudinal axis of spindle S. Projection 33' has an outer diameter slightly less than a diameter of an aperture 34' formed through a portion 30' of a headshell 24'.

Alignment nipple 30' is removably mounted on spindle S and a tone arm assembly 10 including headshell 24' is pivoted until aperture 34' is vertically aligned with pin-shaped projection 33'. When headshell 24' is properly positioned over spindle S projection 33' is capable of insertion through aperture 34'. In order to establish the correct mounting position of the tone arm base plate on the turntable prior to alignment of headshell 24' with spindle S, a template may be employed.

Once the tone arm assembly has been properly positioned on the turntable, the arm tube can be disconnected to provide for installation of the pick-up cartridge on the headshell 24'.

An alignment fixture 40' is preferably employed to ensure precise positioning of the pick-up cartridge. The alignment fixture 40' preferably includes an L-shaped member formed by a pair of leg portions 42' and 44' extending perpendicular to one another. Leg portion 42' includes three spaced flange portions 45A', 45B' and 45C' extending outwardly therefrom. Each of the flanges 45A' and 45C' have generally similar shapes and are spaced sufficient distances from flange 45B' to allow insertion of an adjustment tool such as a screw driver therebetween. Flange 45B' has a substantially rectangular configuration and includes a cylindrically-shaped boss 46' extending parallel to leg portion 44'. Boss 46' has a diameter slightly less than a diameter of an aperture 48' extending through headshell 24'. Alignment fixture 40' further includes a substantially rectangularly shaped clear plate 50' pivotally attached to an end of leg portion 44' remotely positioned from leg portion 42'. Preferably, plate 50' is formed of plexiglass or the like and can be pivoted to either side of leg portion 44'. A cross-hair index 52' is formed on plate 50' with a point of intersection 53' corresponding to proper overhang of the stylus tip, in this example 17.638 mm ahead of spindle S.

Headshell 24' is inverted and positioned such that boss 46' projects through aperture 48'. A pick-up cartridge, not shown, is then arranged on headshell 24' until the stylus tip contacts cross-hair intersection 53'. The pick-up cartridge is further adjusted such that the stylus cantilever aligns with the longitudinal axis of plate 50' as manifested by cross-hair 54'. Once the pick-up cartridge is properly mounted on headshell 24', an appropriate fastening tool is inserted between flanges 45A' and 45B' and between flanges 45B' and 45C' to tighten conventional fastening screws extending from the pick-up cartridge into clamping engagement with the headshell.

The present invention is not to be limited to the above-discussed embodiments, but is to be limited only by the scope of the following claims.

I claim:
1. A phonograph assembly comprising:
 (a) a pivotable tone-arm sub-assembly comprising an elongated tone arm, a counterweight positioned toward one end of said tone arm, and a head shell adapted for mounting a cartridge in an operative position toward the opposite end of said tone arm, said cartridge comprising a stylus fixed to a stylus cantilever, said catridge cantilever having a longitudinal axis;
 (b) a unipivot bearing for supporting said sub-assembly for pivotal movement about a pivot point, said pivot point being positioned with respect to the center of gravity of said sub-assembly such that displacing said tone arm sub-assembly and operably positioned cartridge from any given position by pivoting it generates no appreciable force tending to restore said tone arm to said given position; and
 (c) lateral balancing means comprising two balancing members extending outwardly from opposite sides of said tone arm sub-assembly, said members being positioned so that an axis running from one said member to the other said member is perpendicular to said stylus cantilever axis and intersects a vertical line through said pivot point slightly below said pivot point;
 whereby said assembly is in a balanced condition such that (1) said counterweight can be adjusted to create a desired tracking force, (2) said lateral balancing means defines a preferred vertical pivoting plane perpendicular to said axis running between said lateral balancing members, thus providing a beam balance force resisting rotation of said elongated tone arm about its longitudinal axis and maintaining said stylus cantilever in said preferred pivoting plane during vertical pivoting of said tone arm, and (3) vertical pivoting of the tone arm over a warped record does not generate appreciable restoring force, thus maintaining said tracking force substantially constant during said vertical pivoting.

2. A phonograph assembly according to claim 1 including a substantially rigid tone arm sub-assembly having one end attached to a housing and the other end attached to said head shell, said tone arm sub-assembly including a first tubular member and a second tubular member surrounding and spaced from said first tubular member, with each tubular member extending between said housing and said head shell, and a plurality of concentric energy-absorbing bands positioned between the first and second tubular members for suppressing vibrations from being transmitted through said tone arm sub-assembly.

3. A tone arm balancing assembly comprising the phonograph assembly of claim 1 wherein, (a) said balancing assembly comprises a frame with a support assembly, including a support shaft extending therefrom;

(b) said tone-arm sub-assembly includes:

(1) a housing portion positioned adjacent to said support assembly, said tone arm extending outwardly from a side of said housing, and a balancing arm extending outwardly from an opposite side of said housing, wherein said tone arm supports said head shell and said balancing arm portion supports said counterweight with a longitudinal axis extending between said balancing arm portion and said tone arm portion; and (2) said unipivot bearing extends between said tone arm sub-assembly and said support shaft.

4. A tone arm balancing assembly according to claim 3 wherein said counterweight comprises an easily removable counterweight assembly, said counterweight assembly comprising a balancing arm having an attachment portion and a fixed shoe fastened to said housing, said shoe comprising an aperture adapted for receiving said attachment portion, and said balancing arm with attached counterweight being insertable into said retaining shoe and secured in place by fixing screw.

5. A tone arm balancing assembly according to claim 3 wherein said unipivot bearing comprises a vertically extending pivot pin assembly attached to a cap-shaped end portion of said housing portion and extending into a cup-shaped end portion of said support assembly, and the point of contact between said pivot pin assembly and said recess coincides with said center of gravity.

6. A tone arm balancing assembly according to claim 3, wherein said housing portion includes a cylindrically-shaped outer surface, with said tone arm portion and said balancing arm portion extending substantially perpendicularly from said outer surface and spaced 180° from one another as measured about the circumference of said outer surface of said housing portion.

7. A tone arm balancing assembly according to claim 3, wherein said lateral balancing means comprises a pair of threaded shaft members extending from said housing portion on opposite sides of the longitudinal axis of said tone arm sub-assembly, with each shaft supporting a counterweight mounted thereon, each of said threaded shaft members forming an angle with both said tone arm portion and said balancing arm portion, with a common center of gravity for said pair of threaded shafts and respective counterweight assemblies located in a horizontal plane positioned vertically beneath a horizontal plane extending through the longitudinal axis of said tone arm sub-assembly when in a rest position.

8. A tone arm balancing assembly according to claim 7, wherein each threaded shaft and counterweight assembly mounted thereon has a center of gravity intersecting an imaginary vertical plane extending through said tone arm sub-assembly, said imaginary vertical plane being displaced in a clockwise direction by an angle of substantially 23° as compared to a further imaginary vertical plane extending perpendicular to a longitudinal axis through said tone arm sub-assembly.

9. A balancing assembly according to claim 3, wherein said support assembly includes a substantially straight support shaft extending in a vertically downward direction from said housing portion, said support assembly further includes a base plate fixedly mounted on said phonograph assembly frame and formed with an elongated slot sufficient in size to allow said support shaft to extend therethrough.

10. A tone arm balancing assembly according to claim 9, wherein said support assembly further includes a slide member surrounding said shaft and arranged on a side of said base plate remotely positioned from said housing portion, said support assembly further includes a mounting block assembly slidably mounted on said base plate and fixedly attached to said slide member, wherein said mounting block and slide members overlap opposite sides of said elongated slot.

11. A tone arm balancing assembly according to claim 10, wherein said mounting block assembly includes a cavity having a clamping block slidably disposed therein, said cavity and said clamping block having confronting semi-cylindrical surface portions forming an aperture of a size sufficient to allow said support shaft to extend through said mounting block, said mounting block further includes engagement means for biasing said confronting semi-cylindrical surface portions into frictional contact with said support shaft.

12. A tone arm balancing assembly according to claim 3, wherein a carrier assembly at least partially encloses said balancing arm portion, said carrier assembly supporting a hollow counterweight assembly for joint movement therewith, said carrier assembly including drive means engaging said balancing arm portion for selectively altering the position of said carrier assembly and counterweight without altering the position of the center of gravity of said counterweight relative to a longitudinal axis through said balancing arm portion.

13. A phonograph assembly of the type including a support assembly pivotally supporting a tone arm assembly mounted thereon, said tone arm assembly including a support collar and balancing arm extending through said support collar and a counterweight surrounding a portion of said support collar, with a pair of radially aligned grooves formed in confronting surface portions of said support collar and said counterweight, and dampening means engaging and extending between said pairs of radially aligned grooves for supporting said counterweight while suppressing vibrations from being transmitted between said counterweight and said balancing arm, said dampening means comprising a ring of resiliently deformable material.

14. A removable counterweight assembly for applying a predetermined tracking force to a pivotally mounted tone arm, and comprising:

a balancing arm removably attached to a housing supporting said pivotally mounted tone arm, said balancing arm supporting an adjustable carrier assembly having a counterweight mounted thereon, said carrier assembly including drive means engaging said balancing arm for selectively altering the position of said carrier assembly and counterweight along said balancing arm without rotating said counterweight and thereby possibly altering the position of the counterweight center of gravity relative to a lateral axis through said balancing arm, said carrier assembly including a hub portion completely enclosing a portion of said balancing arm and a substantially U-shaped sleeve portion partially enclosing a further portion of said balancing arm, said hub portion including a groove of sufficient size to receive a ring of energy absorbing material which contacts and provides the sole support for said counterweight, said drive means comprising a pinion gear rotatably supported between said U-shaped sleeve portion, said pinion gear meshing with a rack gear formed in a vertically bottom surface of said balancing arm, and said drive means further comprising a control handle attached to said pinion gear for joint rotation, wherein rotation of said pinion gear causes said carrier assembly and attached counterweight to move relative to said fixed rack gear, to alter the tracking force acting on the pivotable tone arm.

* * * * *